(12) United States Patent
Kwon et al.

(10) Patent No.: US 7,359,431 B2
(45) Date of Patent: Apr. 15, 2008

(54) CHANNEL ESTIMATION APPARATUS AND METHOD IN DIGITAL COMMUNICATION SYSTEM

(75) Inventors: Yong-sik Kwon, Seoul (KR); Jin-hee Jeong, Seoul (KR); Jung-jin Kim, Daegu (KR)

(73) Assignee: Samsung Electronics Co., Ltd., Suwon (KR)

( * ) Notice: Subject to any disclaimer, the term of this patent is extended or adjusted under 35 U.S.C. 154(b) by 712 days.

(21) Appl. No.: 10/621,447

(22) Filed: Jul. 18, 2003

(65) Prior Publication Data

US 2005/0175126 A1 Aug. 11, 2005

(30) Foreign Application Priority Data

Feb. 18, 2003 (KR) .................. 10-2003-0010157

(51) Int. Cl.
*H04B 1/00* (2006.01)

(52) U.S. Cl. ................ 375/150; 375/130; 375/140; 375/147; 375/152; 375/316; 375/340; 375/343

(58) Field of Classification Search ............ 375/130, 375/140, 147, 150, 152, 316, 340, 343; 455/63.1
See application file for complete search history.

(56) References Cited

U.S. PATENT DOCUMENTS

| 5,905,946 | A  | * | 5/1999  | Lilleberg et al.  | 455/63.1 |
| 6,990,160 | B1 | * | 1/2006  | Abe et al.        | 375/355  |
| 2002/0181557 | A1 | * | 12/2002 | Fujii          | 375/147  |
| 2004/0017843 | A1 | * | 1/2004  | Fitton et al.  | 375/148  |

* cited by examiner

*Primary Examiner*—Mohammed Ghayour
*Assistant Examiner*—Leila Malek
(74) *Attorney, Agent, or Firm*—Sughrue Mion, PLLC

(57) ABSTRACT

A channel estimation apparatus in a digital communication system includes: a correlation unit for obtaining a correlation function of a first received signal by correlating a received synchronizing signal and a reference synchronizing signal, and obtaining a correlation function of the received synchronizing signal by a correlation between the synchronizing signals, a first estimating unit for estimating a first multi-path by applying a first threshold value to the correlation function of the first received signal, a correlation noise removing unit for obtaining a correlation function of a second received signal by removing correlation noise included in the correlation function of the first received signal, by a first multi-path, and a second estimating unit for estimating a second multi-path by applying a second threshold value to a correlation function of the second received signal in which the correlation noise has been removed.

16 Claims, 15 Drawing Sheets

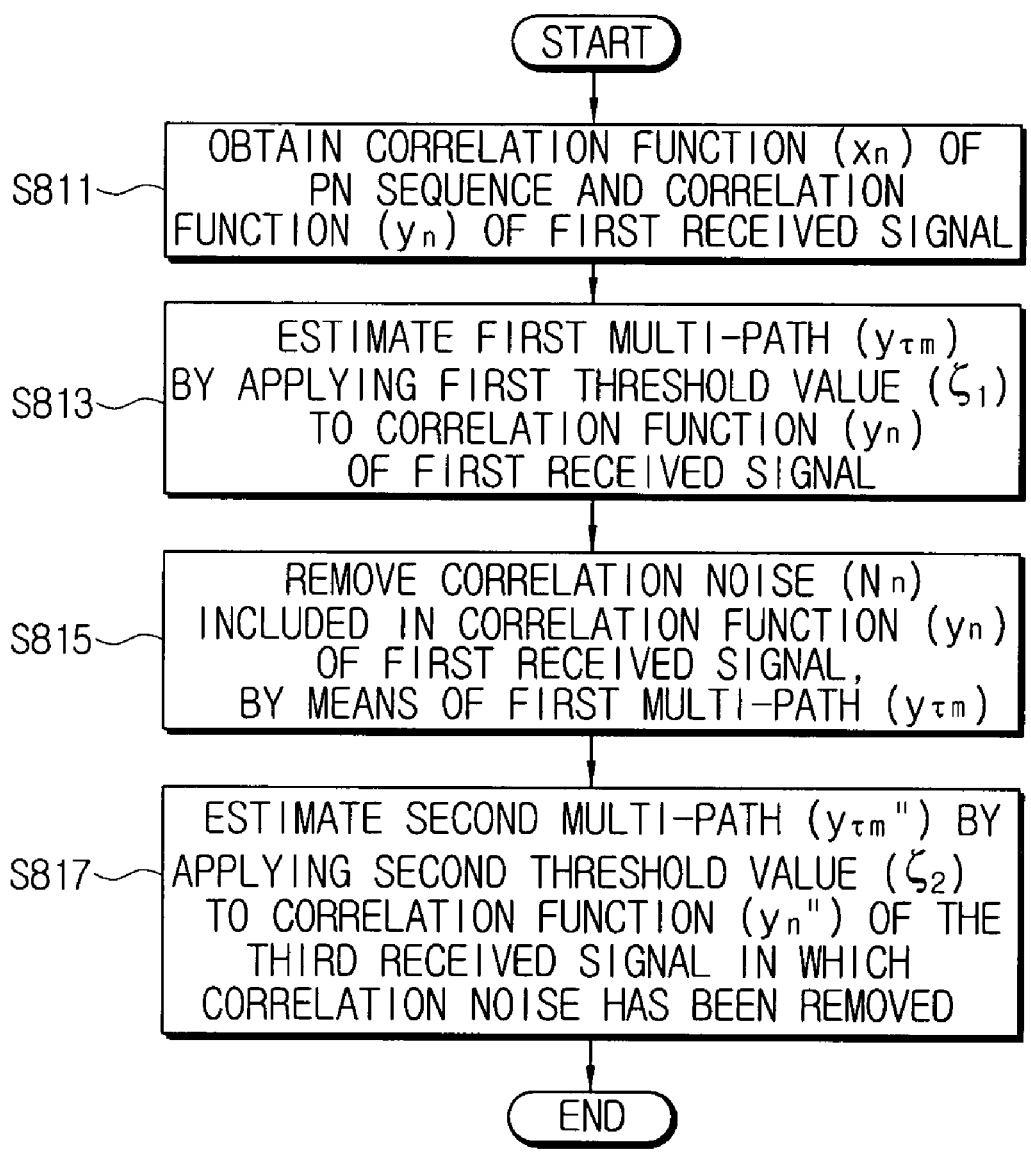

CHANNEL ESTIMATION APPARATUS AND METHOD IN DIGITAL COMMUNICATION SYSTEM

BACKGROUND OF THE INVENTION

1. Field of the Invention

The present invention relates to a digital communication system, and more particularly to a channel estimation apparatus, which estimates multi-path for a received signal by means of a synchronizing signal, that is, a signal reserved in a digital transmission/reception communication system and method thereof. The present application is based on Korean Patent Application No. 2003-10157, which is incorporated herein by reference.

2. Description of the Prior Art

As generally known in the art, in the communication between a transmitter and a receiver, a digital communication system typically inserts a synchronizing signal reserved in advance into user data to be transmitted for synchronization and equalization purposes. Generally, a PN (pseudo-noise) sequence has been used as the reserved synchronizing signal. Hereinafter, the PN sequence is described as an example of the reserved synchronizing signal.

FIG. 1 is a schematic block diagram regarding a typical channel estimation apparatus.

The channel estimation apparatus includes a correlation unit 111 and an estimating unit 113. The correlation unit 111 calculates a correlation value for correlation between a PN sequence received via a channel and a reference PN sequence. The estimating unit 113 searches a correlation value above a predetermined threshold value, and estimates the correlation value and location as the size and location of multi-path.

In this case, the predetermined threshold value should be larger than maximum correlation noise. The correlation noise is noise which has a small value due to the correlation even in a state where there is no influence by noise and adjacent data, as shown in FIGS. 2A to 2C. The correlation noise has different values according to the length of the PN sequence, as shown in Table 1.

TABLE 1

| length of PN sequence | 63 | 255 | 511 |
|---|---|---|---|
| Maximum correlation noise | 0.1109(−19.1) | 0.0708(−23.0) | 0.0412(−27.7) |

Linear scale (dB scale)

Since the maximum correlation noise according to the length of the PN sequence is as shown in Table 1, the predetermined threshold value should be larger than the values shown in Table 1. Further, since values smaller than the threshold value are abandoned, multi-path below the threshold value included in the correlation noise cannot be estimated.

FIG. 2 is a graph showing a channel estimation performance when weak multi-path exists. The correlation unit 111 calculates a correlation value of a received signal having sizes such as 0 dB, −10 dB, −25 dB and delay such as 0Ts, 30Ts, 60Ts as shown in FIG. 2B, by means of a correlation between a PN sequence received via a channel shown in FIG. 2A and a PN sequence, which is a reference signal. Then, the estimating unit 113 estimates the channel as shown in FIG. 2C by applying a threshold value to the correlation value of the received signal as shown in FIG. 2B.

Herein, when the received channel shown in FIG. 2A is compared with the estimated channel shown in FIG. 2C, the −25 dB path of the received channel is not estimated.

FIG. 3 is a graph showing a channel estimation performance when strong multi-path exists. The correlation unit 111 calculates a correlation value of received signal having sizes such as 0 dB, −1 dB, −3 dB and delay such as 0Ts, 30Ts, 60Ts as shown in FIG. 3B, by means of a correlation between a PN sequence received via a channel shown in FIG. 3A and a PN sequence which is a reference signal. Then, the estimating unit 113 estimates the channel as shown in FIG. 3C by applying a threshold value to the correlation value of the received signal as shown in FIG. 3B.

Herein, regarding the correlation value of the received signal shown in FIG. 3B, the entire correlation noise increases due to the strong multi-path correlation noise. Further, many changes occur in peak values appearing on the multi-path. Accordingly, the threshold value set by the estimating unit 113 should increase, but if so, since multi-path below the threshold value can not be estimated, the errors of the estimated channel become large as shown in FIG. 3C.

As described above, channel estimation error generally occurs as a result of noise from correlation between a signal received via a channel and a PN sequence, inter symbol interference, and the correlation noise, etc. In this case, channel estimation error caused by the noise and inter symbol interference may be removed by means of several symbol averages, but performance deterioration caused by the correlation noise can not be removed by means of the several symbol averages.

Accordingly, there has been a problem in that channel estimation error occurs as a result of the correlation noise.

SUMMARY OF THE INVENTION

Accordingly, the present invention has been made to solve the above-mentioned problems occurring in the prior art, and an object of the present invention is to provide a channel estimation apparatus and method in a digital communication system which can remove performance deterioration caused by a correlation noise.

In order to accomplish this object, there is provided a channel estimation apparatus in a digital communication system comprising: a correlation unit for obtaining a correlation function $y_n$ of a first received signal by means of a correlation between a received signal and a synchronizing signal, which is a reference signal, and obtaining a correlation function $x_n$ of the synchronizing signal by means of a correlation between the synchronizing signal; a first estimating unit for estimating a first multi-path $y_{\tau m}$ by applying a first threshold value $\zeta 1$ to the correlation function $y_n$ of the first received signal, in which $\tau m$ represents a location of the estimated multi-path; a correlation noise removing unit for obtaining a correlation function $y_n''$ of a third received signal by removing a correlation noise $N_n$ included in the correlation function $y_n$ of the first received signal, by means of the first multi-path $y_{\tau m}$; and a second estimating unit for estimating a second multi-path $y_{\tau m}''$ by applying a second threshold value $\zeta 2$ to the correlation function $y_n''$ of the third received signal in which the correlation noise $N_n$ has been removed.

The correlation noise removing unit obtains a channel impulse response function $h_{\tau m}$ backtracked by means of the first multi-path $y_{\tau m}$, obtains a correlation function $y_{\tau m}'$ of a second received signal by means of the backtracked channel impulse response function $h_{\tau m}$, obtains the correlation noise $N_n$ by subtracting the backtracked channel impulse response function $h_{\tau m}$ from the correlation function of the second received signal, and outputs the correlation function $y_n''$ of the third received signal by removing the correlation noise $N_n$ from the correlation function $y_n$ of the first received signal.

The backtracked channel impulse response function $h_{\tau m}$ is defined by the following equation, $h_{\tau m} = x_{\tau m}^{-1} y_{\tau m}$, wherein $x_{\tau m}$ is the correlation function $x_n$ of the synchronizing signal corresponding to τm.

The correlation noise $N_n$ is defined by the following equation.

$$N_n = y_n' - h_{\tau m},$$

The correlation function $y_n''$ of the third received signal is defined by the following equation.

$$y_n'' = y_n - N_n = y_n - (y_n' - h_{\tau m})$$

The correlation noise removing unit removes the correlation noise in sequence according to a size of the first multi-path $y_{\tau m}$, or removes the correlation noise according to the sequence in which the first multi-path $y_{\tau m}$ is received.

In order to accomplish this object, there is provided a channel estimation method in a digital commnunication system comprising the steps of: (1) obtaining a correlation function $y_n$ of a first received signal by means of a correlation between a received synchronizing signal and a reference synchronizing signal, and obtaining a correlation function $x_n$ of the received synchronizing signal by means of a correlation between the synchronizing signals; (2) estimating a first multi-path $y_{\tau m}$ by applying a first threshold value $\zeta 1$ to the correlation function $y_n$ of the first received signal, in which $y_{\tau m}$ represents a location of the estimated multi-path; (3) obtaining a correlation function $y_n''$ of a third received signal by removing correlation noise $N_n$ included in the correlation function $y_n$ of the first received signal, by means of the first multi-path $y_{\tau m}$, and (4) estimating a second multi-path $y_{\tau m}''$ by applying a second threshold value $\zeta 2$ to the correlation function $y_n''$ of the third received signal in which the correlation noise $N_n$ has been removed.

In step 3, a channel impulse response function $h_{\tau m}$ backtracked by means of the first multi-path $y_{\tau m}$ is obtained, a correlation function $y_n'$ of a second received signal is obtained by means of the backtracked channel impulse response function $h_{\tau m}$, the correlation noise $N_n$ is obtained by subtracting the backtracked channel impulse response function $h_{\tau m}$ from the correlation function $y_n'$ of the second received signal, and the correlation function $y_n''$ of the third received signal is obtained by removing the correlation noise $N_n$ from the correlation function $y_n$ of the first received signal.

Accordingly, the present invention can remove the correlation noise, which is one conventional factor deteriorating the performance of the channel estimation apparatus and has not been eliminated yet, thereby reducing channel estimation error.

BRIEF DESCRIPTION OF THE DRAWINGS

The above and other objects, features and advantages of the present invention will be more apparent from the following detailed description taken in conjunction with the accompanying drawings, in which:

FIG. 8 is a flow chart regarding a channel estimation method according to the present invention.

DETAILED DESCRIPTION OF THE PREFERRED EMBODIMENTS

Hereinafter, a preferred embodiment of the present invention will be described with reference to the accompanying drawings.

Figure 1:
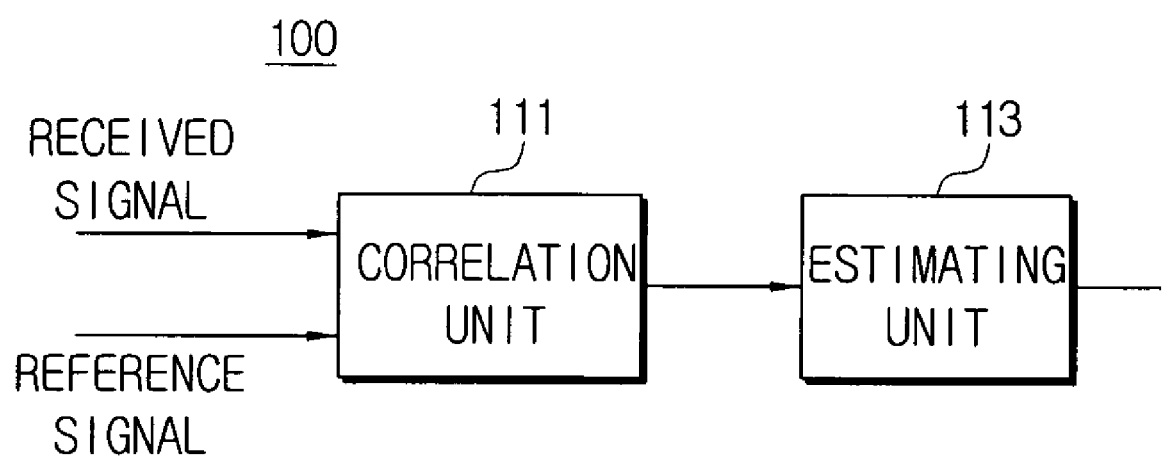
FIG. 1 is a schematic block diagram regarding a typical channel estimation apparatus.
Figure 2A:
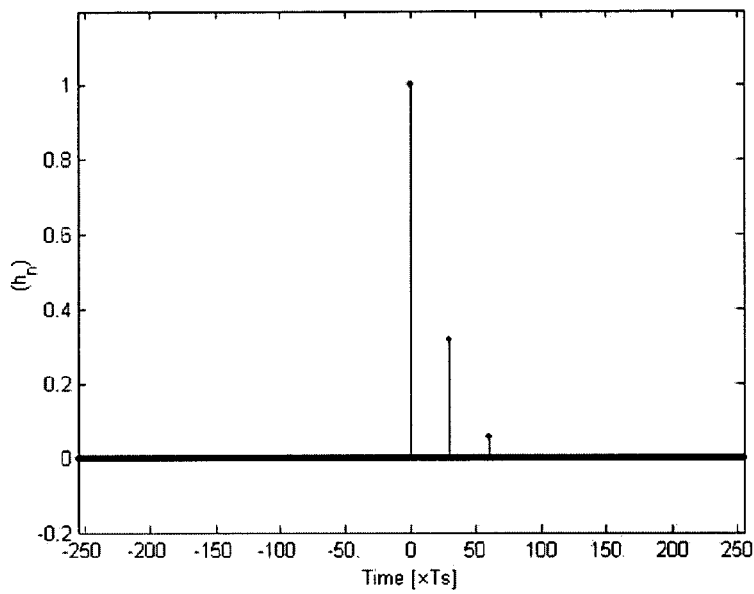
FIGS. 2A to 2C are graphs illustrating a process in which weak multi-path is estimated by means of the channel estimation apparatus in FIG. 1, FIGS. 3A to 3C are graphs illustrating a process in which strong multi-path is estimated by means of the channel estimation apparatus in FIG. 1.
Figure 2B:
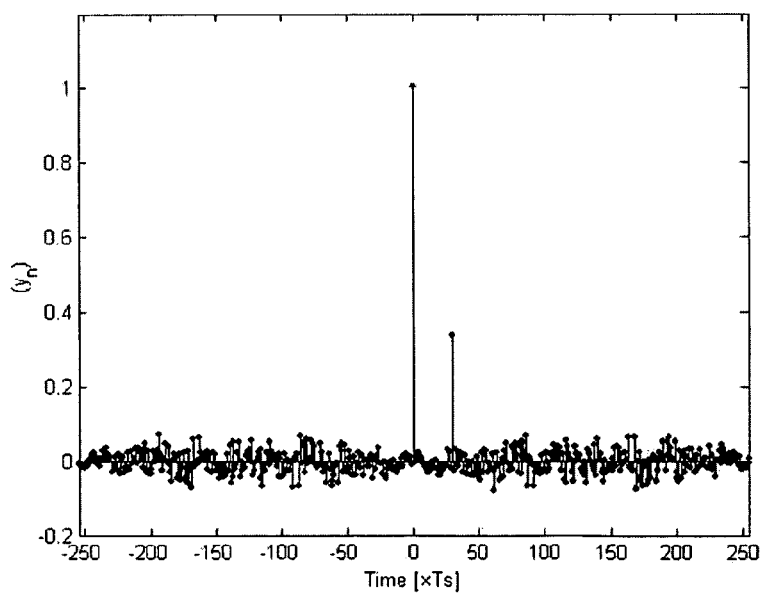
Figure 2C:
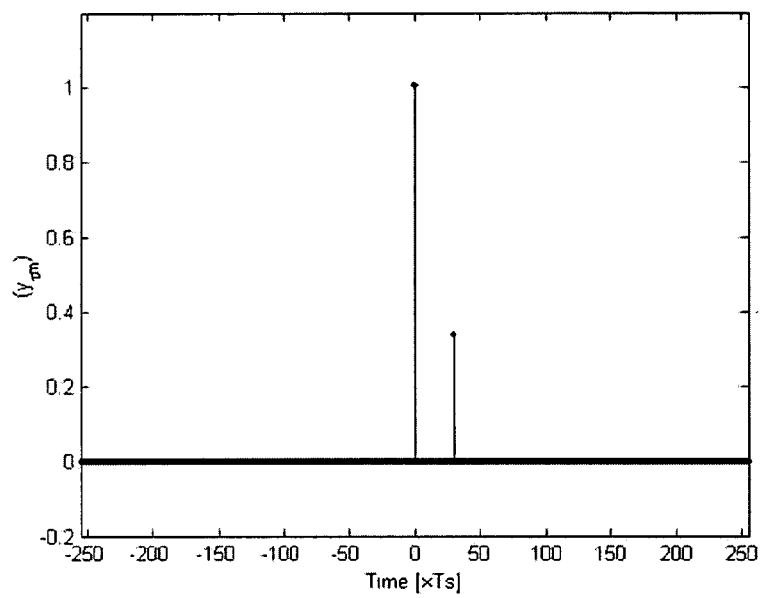
Figure 3A:
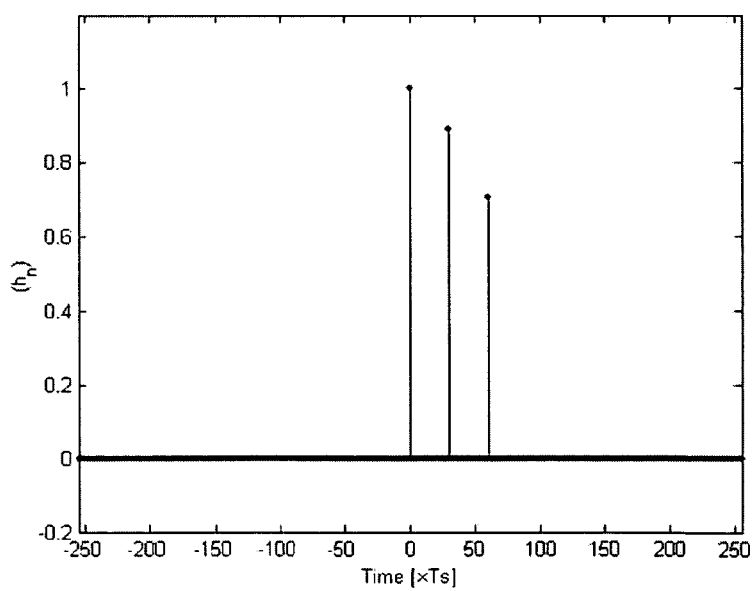
Figure 3B:
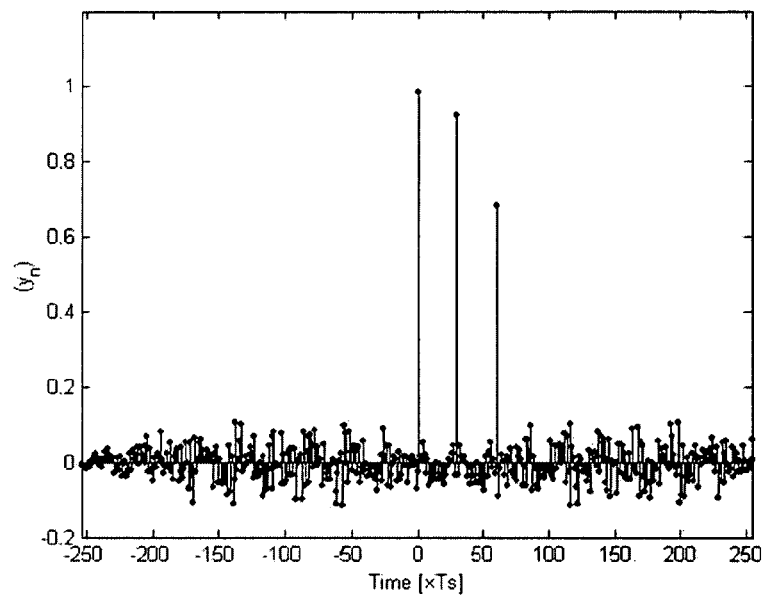
Figure 3C:
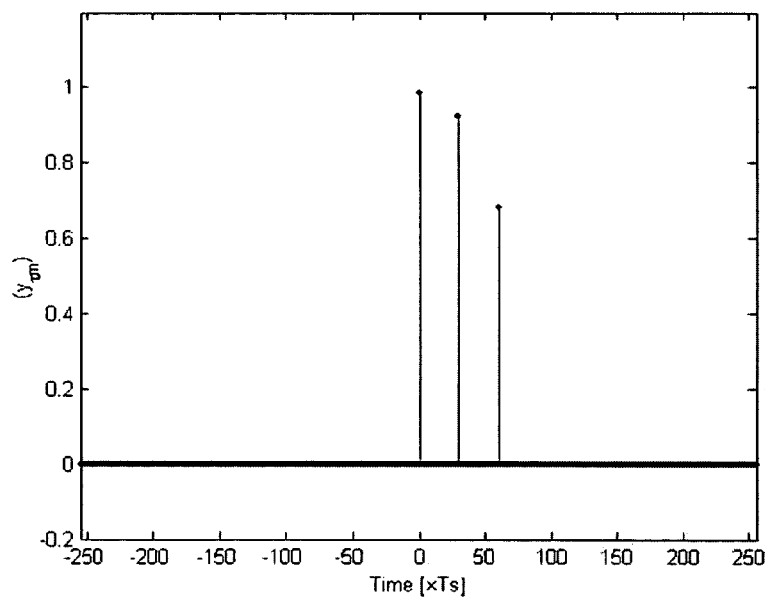
Figure 4:
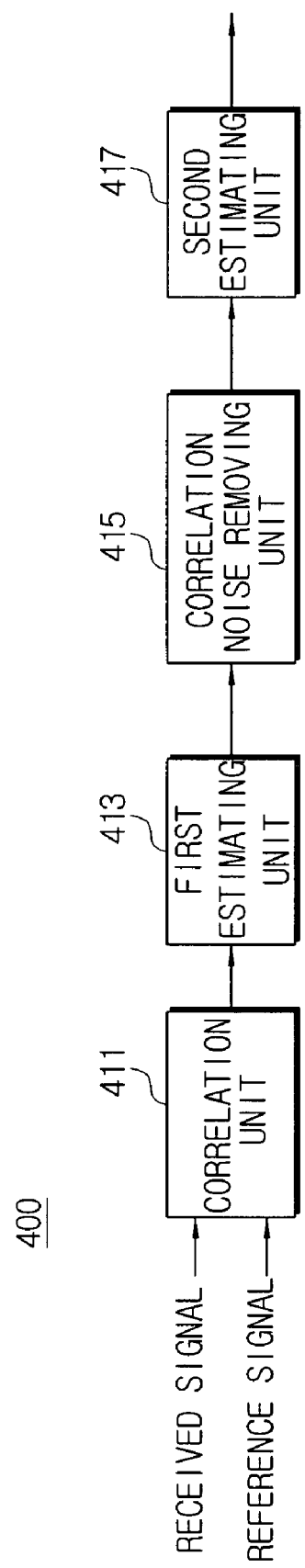
FIG. 4 is a schematic block diagram regarding a channel estimation apparatus according to the present invention.

FIG. 4 is a schematic block diagram regarding a channel estimation apparatus in a digital communication system according to the present invention.

The channel estimation apparatus 400 includes a correlation unit 411, a first estimating unit 413, a correlation noise removing unit 415 and a second estimating unit 417. Hereinafter, a PN sequence is described as an example of a synchronizing signal for estimating a channel, between transmitter and receiver.

The correlation unit 411 obtains a correlation function of a received signal by means of correlation between a PN sequence received via the channel, which is a received signal, and a PN sequence generated by a system, which is a reference signal. Further, the correlation unit 411 obtains a correlation function of the received PN sequence by means of a correlation between the PN sequences.

The first estimating unit 413 applies a first threshold value to the obtained correlation function of the received signal and estimates a correlation value more than the first threshold value as a first multi-path.

The correlation noise removing unit 415 removes a correlation noise included in the correlation function of the received signal, by means of the first multi-path estimated by the first estimating unit 413.

The second estimating unit 417 applies a second threshold value to the correlation function of the received signal in which noise has been removed, and finally estimates a correlation value more than the second threshold value as a second multi-path. In this case, the first threshold value and the second threshold value may be fixed and the second threshold value is set to a relatively smaller value with respect to the first threshold value.

As described above, the present invention removes noise included in the correlation function of the received signal obtained by means of the correlation between the received signal and the PN sequence, so as to apply the threshold value again and estimate the multi-path, thereby reducing channel estimation error.

FIG. 6 is a graph illustrating a process of estimating a channel in which weak multi-path exists, according to the present invention. FIG. 7 is a graph illustrating a process of estimating a channel in which strong multi-path exists, according to the present invention. FIG. 8 is a flow chart regarding a channel estimation method according to the present invention. Hereinafter, referring to FIG. 6 and FIG. 8, the process of estimating channel in which weak multi-path exists, is described in detail.

The correlation unit 411 obtains a correlation function $y_n$ (n is an integer) of a first received signal by means of a correlation between a received signal and a PN sequence, and a correlation function $x_n$ of a PN sequence by means of a correlation between PN sequences (S811). In this case, the PN sequence is a reference signal generated by a system, and is called a 'correlation function of a first PN sequence' so as to be distinguished from a correlation function $x_{\tau m}$ of a second PN sequence to be mentioned later.

Figure 6A:
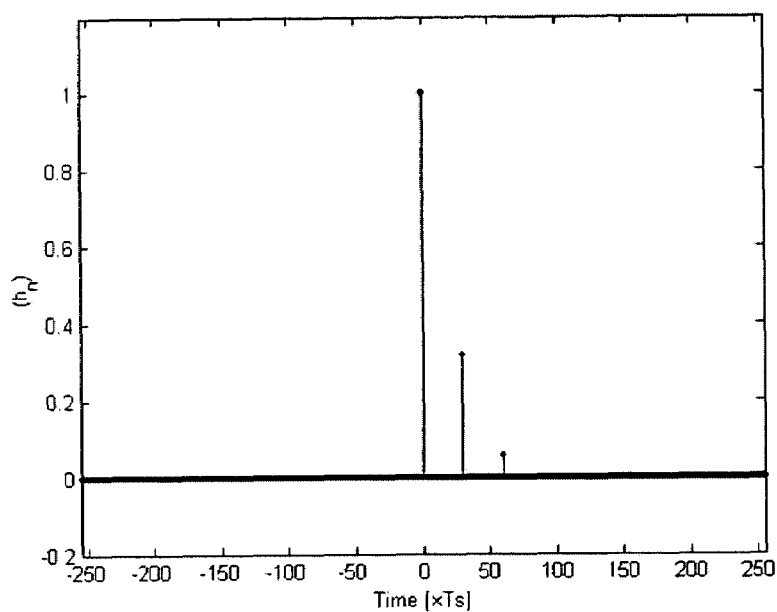
FIGS. 6A to 6H are graphs illustrating a process in which weak multi-path is estimated by means of the channel estimation apparatus in FIG. 4, FIGS. 7A to 7H are graphs illustrating a process in which strong multi-path is estimated by means of the channel estimation apparatus in FIG. 4.

Also, an impulse response function $h_n$ according to a received channel is shown in FIG. 6A, and can be defined by the following equation 1.

$$h_n = x_n^{-1} y_n \qquad \text{Equation 1}$$

The channel impulse response function $h_n$ is called 'a first channel impulse response function' so as to be distinguished from a second channel impulse response function $h_{\tau m}$ to be mentioned later.

Figure 5:
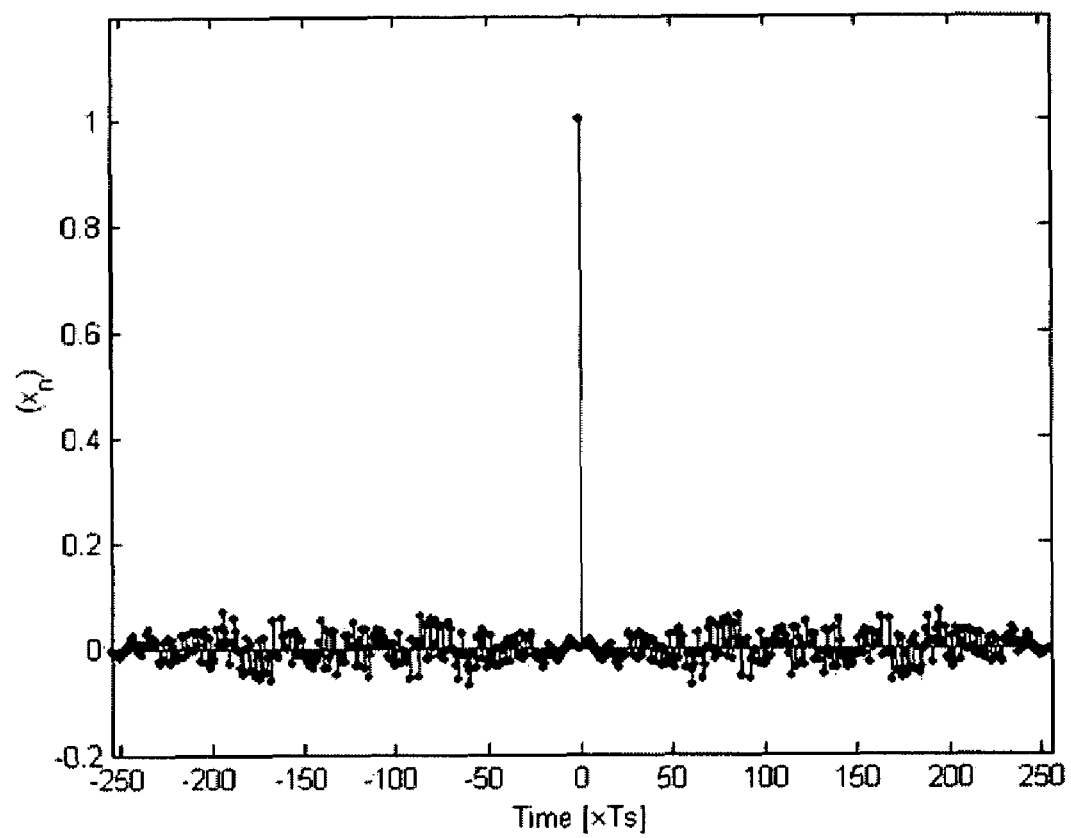
FIG. 5 is a graph showing a correlation function $X_n$ of a synchronizing signal obtained by means of the channel estimation apparatus according to the present invention.
Figure 6B:
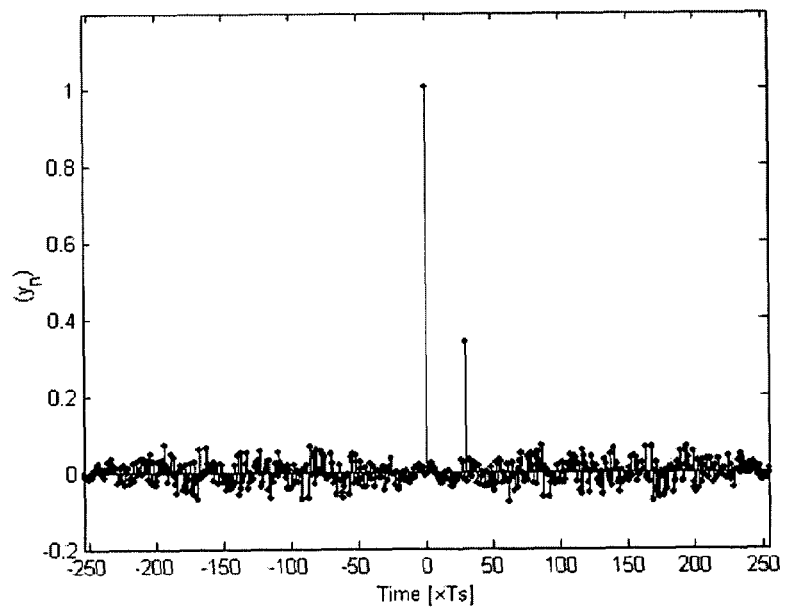

The correlation function $x_n$ of the first PN sequence obtained by the correlation unit 411 is shown in FIG. 5, and the correlation function $y_n$ of the first received signal is shown in FIG. 6B.

The first estimating unit 413 applies a predetermined first threshold value $\zeta 1$ to the correlation function $y_n$ of the first received signal as shown in FIG. 6B, and estimates a correlation value more than the first threshold value $\zeta 1$ as a first multi-path in step S813. In this case, $\tau m$ (m is an integer) is the location of the first multi-path.

Figure 6C:
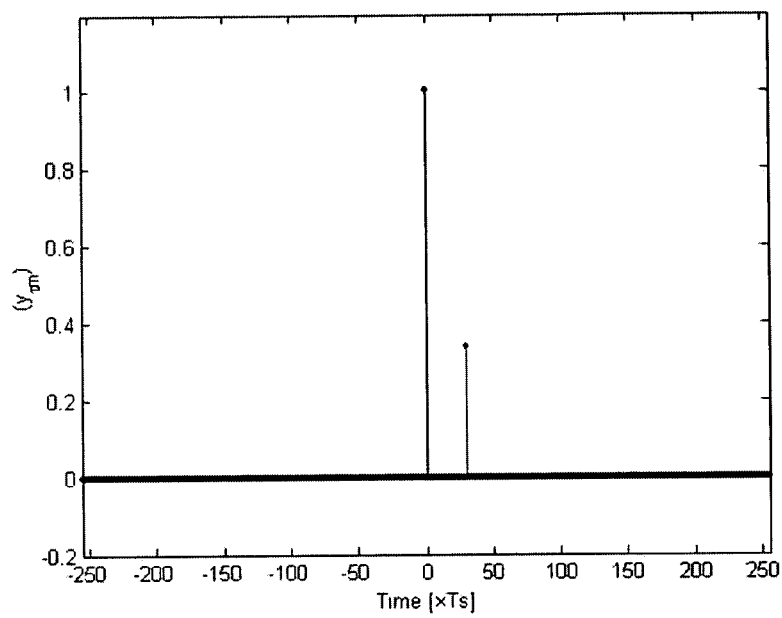

The first multi-path $y_{\tau m}$ generated by applying the first threshold value $\zeta 1$ to the correlation function $y_n$ of the first received signal is defined by equation 2 and is shown in FIG. 6C.

$$y_{\tau 0} = x_{\tau 0 - \tau 0} \times h_{\tau 0} + x_{\tau 1 - \tau 0} \times h_{\tau 1} + x_{\tau 2 - \tau 0} \times h_{\tau 2} + x_{\tau 3 - \tau 0} \times h_{\tau 3} + \ldots$$

$$y_{\tau 1} = x_{\tau 0 - \tau 1} \times h_{\tau 0} + x_{\tau 1 - \tau 1} \times h_{\tau 1} + x_{\tau 2 - \tau 1} \times h_{\tau 2} + x_{\tau 3 - \tau 1} \times h_{\tau 3} + \ldots$$

$$y_{\tau 2} = x_{\tau 0 - \tau 2} \times h_{\tau 0} + x_{\tau 1 - \tau 2} \times h_{\tau 1} + x_{\tau 2 - \tau 2} \times h_{\tau 2} + x_{\tau 3 - \tau 2} \times h_{\tau 3} + \ldots$$

$$y_{\tau 3} = x_{\tau 0 - \tau 3} \times h_{\tau 0} + x_{\tau 1 - \tau 3} \times h_{\tau 1} + x_{\tau 2 - \tau 3} \times h_{\tau 2} + x_{\tau 3 - \tau 3} \times h_{\tau 3} + \ldots \qquad \text{Equation 2}$$

As described above, the correlation noise removing unit 415 removes a correlation noise included in the correlation function $y_n$ of the first received signal, by means of the first multi-path $y_{\tau m}$ estimated by the first estimating unit 413 in step S815.

Hereinafter, a process of finding the correlation noise included in the correlation function $y_n$ of the first received signal, is described. First, the second channel impulse response function $h_{\tau m}$ is obtained by performing a back-tracking by means of the first multi-path $y_{\tau m}$ obtained through equation 1 and equation 2.

A process of performing the back-tracking with respect to the second channel impulse response function $h_{\tau m}$, by means of the first multi-path $y_{\tau m}$, is defined by equation 3.

$$h_{\tau m} = x_{\tau m}^{-1} y_{\tau m} \qquad \text{Equation 3}$$

In this case, $y_{\tau m}$ is the first multi-path $y_{\tau m}$ obtained by the first estimating unit 413, and $x_{\tau m}$ is a value of the correlation function $x_n$ of the first PN sequence according to the location $\tau m$ of the first multi-path $y_{\tau m}$. Hereinafter, $x_{\tau m}$ is called a correlation function $x_n$ of a second PN sequence.

Also, equation 3 may be defined by a matrix of equation 4, and the second channel impulse response function $h_{\tau m}$ can be obtained by equation 4.

$$h_{\tau m} = \begin{bmatrix} x_{\tau 0 - \tau 0} & x_{\tau 1 - \tau 0} & x_{\tau 2 - \tau 0} & x_{\tau 3 - \tau 0} & \cdots \\ x_{\tau 0 - \tau 1} & x_{\tau 1 - \tau 1} & x_{\tau 2 - \tau 1} & x_{\tau 3 - \tau 1} & \cdots \\ x_{\tau 0 - \tau 2} & x_{\tau 1 - \tau 2} & x_{\tau 2 - \tau 2} & x_{\tau 3 - \tau 2} & \cdots \\ x_{\tau 0 - \tau 3} & x_{\tau 1 - \tau 3} & \cdots & & \end{bmatrix}^{-1} \begin{bmatrix} y_{\tau 0} \\ y_{\tau 1} \\ y_{\tau 2} \\ y_{\tau 3} \\ \cdots \end{bmatrix} \qquad \text{Equation 4}$$

Equation 4 is a calculation equation when the correlation noise included in the all correlation function $y_n$ of the first received signal is removed.

The following equation 5 is a calculation equation when the correlation noise is removed in sequence according to the size of a first multi-path $y_{\tau m}$. In this case, the first multi-path $y_{\tau m}$ has a size which decreases in sequence of $y_{\tau 1} > y_{\tau 0} > y_{\tau 2} > y_{\tau 3}$.

$$h_{\tau m} = \begin{bmatrix} x_0 & x_{\tau 1} & 0 & 0 & \cdots \\ 0 & x_0 & 0 & 0 & \cdots \\ x_{\tau 2} & x_{\tau 2 - \tau 1} & x_0 & 0 & \cdots \\ x_{\tau 3} & x_{\tau 3 - \tau 1} & x_{\tau 3 - \tau 2} & x_0 & \cdots \end{bmatrix}^{-1} \begin{bmatrix} y_{\tau 0} \\ y_{\tau 1} \\ y_{\tau 2} \\ y_{\tau 3} \\ \cdots \end{bmatrix} \qquad \text{Equation 5}$$

The following equation 6 is a calculation equation when the correlation noise is removed according to a sequence in which the first multi-path $y_{\tau m}$ is received.

$$h_{\tau m} = \begin{bmatrix} x_0 & 0 & 0 & 0 & \cdots \\ x_{\tau 1} & x_0 & 0 & 0 & \cdots \\ x_{\tau 2} & x_{\tau 2 - \tau 1} & x_0 & 0 & \cdots \\ x_{\tau 3} & x_{\tau 3 - \tau 1} & x_{\tau 3 - \tau 2} & x_0 & \cdots \end{bmatrix}^{-1} \begin{bmatrix} y_{\tau 0} \\ y_{\tau 1} \\ y_{\tau 2} \\ y_{\tau 3} \\ \cdots \end{bmatrix} \qquad \text{Equation 6}$$

In this case, the channel estimation apparatus has an amount of calculation which decreases in a sequence of equation 4, equation 5, and equation 6, and a channel estimation performance which decreases in a sequence of equation 4, equation 5, and equation 6.

Figure 6D:
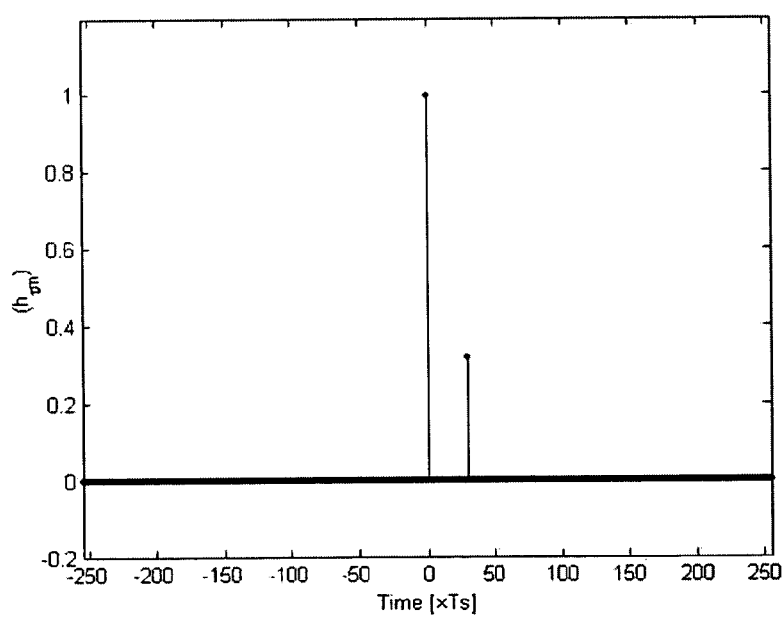

As described above, the second channel impulse response function $h_{\tau m}$ can be obtained by either equation 4, equation 5 or equation 6. FIG. 6D is a graph of the second channel impulse response function $h_{\tau m}$ obtained by equation 4.

A correlation function $y_n'$ of a second received signal, which is similar to the correlation function $y_n$ of the first received signal, is obtained by applying a correlation to the second channel impulse response function $h_{\tau m}$ shown in FIG. 6D and the correlation function $x_n$ of the first PN sequence. The correlation function $y_n'$ of the second received signal may be defined by equation 7.

$$y_n' = corr.(x_n, h_{\tau m}) \qquad \text{Equation 7}$$

Figure 6E:
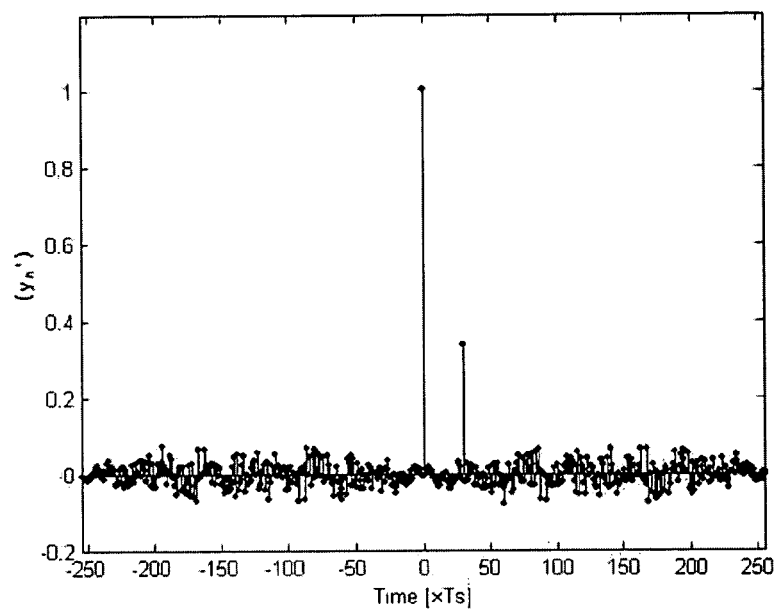
Figure 6F:
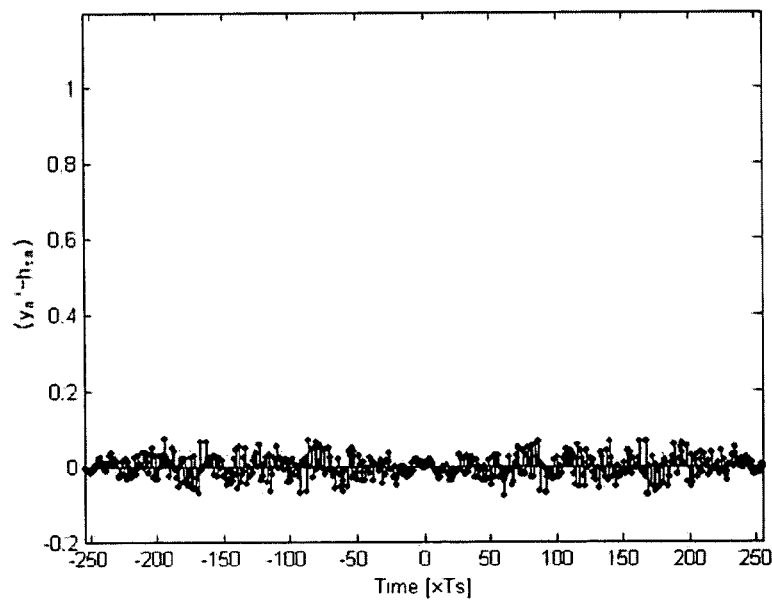
Figure 6G:
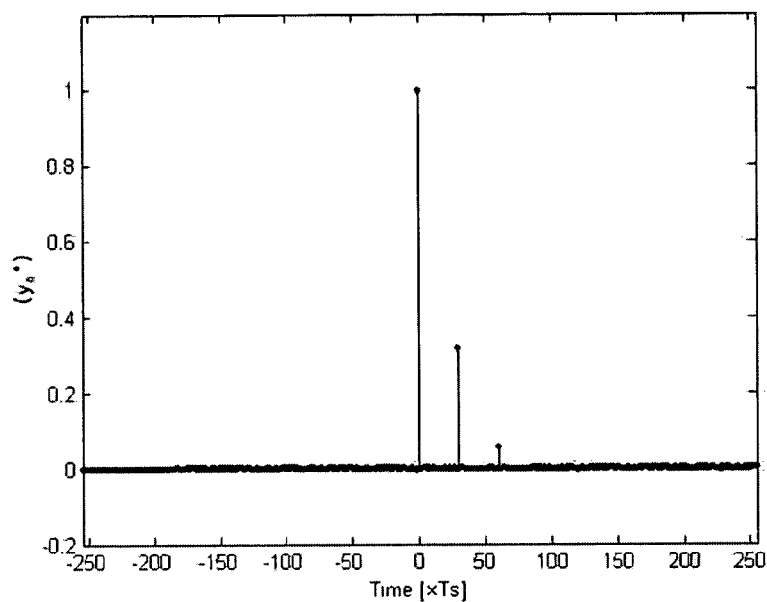

Further, the correlation function $y_n'$ of the second received signal is as shown in FIG. 6E.

When the second channel impulse response function $h_{\tau m}$ shown in FIG. 6D is subtracted from the correlation function $y_n'$ of the second received signal shown in FIG. 6E, only the correlation noise of correlation function $y_n$ of the first received signal remains. That is, the correlation noise $N_n$ may be defined by equation 8.

$$N_n = y_n' - h_{\tau m} \qquad \text{Equation 8}$$

Accordingly, the correlation noise removing unit 415 subtracts the correlation noise $N_n$ of equation 8 from the correlation function $y_n$ of the first received signal, and outputs a correlation function $y_n''$ of a third received signal. The correlation function $y_n''$ of the third received signal from which the correlation noise $N_n$ has been removed, may be defined by equation 9 and shown as FIG. 6G.

$$y_n'' = y_n' - N_n = y_n - (y_n' - h_{\tau m}) \qquad \text{Equation 9}$$

Figure 6H:
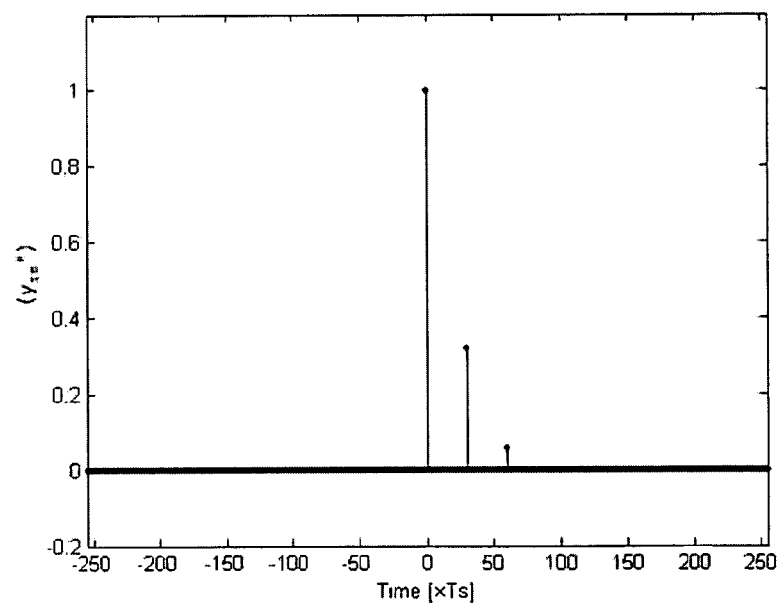

The second estimating unit 417 applies a predetermined second threshold value $\zeta 2$ and estimates a second multi-path $y_{\tau m}''$ more than the second threshold value $\zeta 2$ in step S817. In this case, $_{\tau m}$ (m is an integer) is the location of the second multi-path. FIG. 6H is a graph of the second multi-path $y_{\tau m}''$ estimated by the second estimating unit 417.

Accordingly, the present invention can remove the correlation noise, which is one conventional factor deteriorating the performance of a channel estimation apparatus and has not been eliminated yet, thereby reducing channel estimation error. That is, when the channel impulse response function $h_n$ shown in FIG. 6A is compared with the second multi-path $y_{\tau m}''$, which has been finally estimated, shown in FIG. 6H, the second multi-path $y_{\tau m}''$ can be estimated without error, with respect to the impulse response function $h_n$ of the received channel.

Since a process of estimating a channel in which strong multi-path exists, shown in FIG. 7A to FIG. 7H, is the same as a process of estimating a channel in which weak multi-path exists, shown in FIG. 6A to FIG. 6H, a detailed description is here omitted.

Figure 7A:
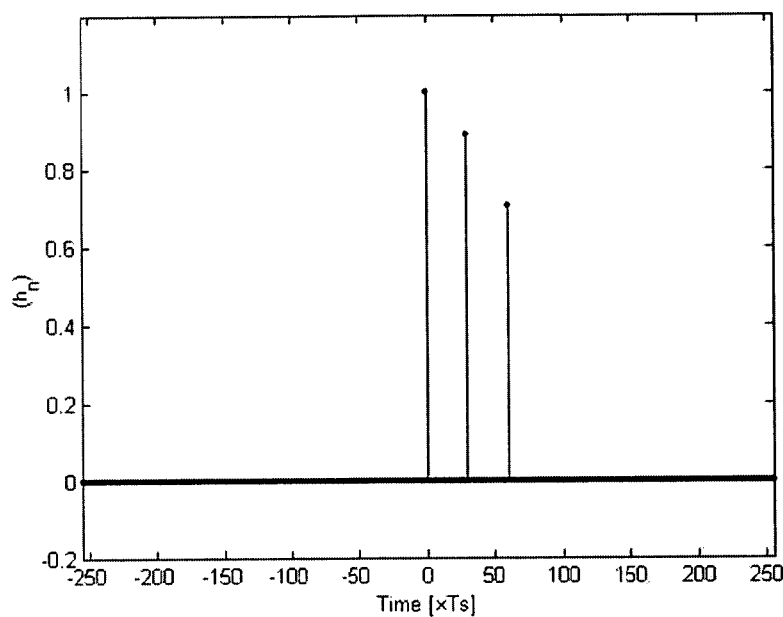
Figure 7B:
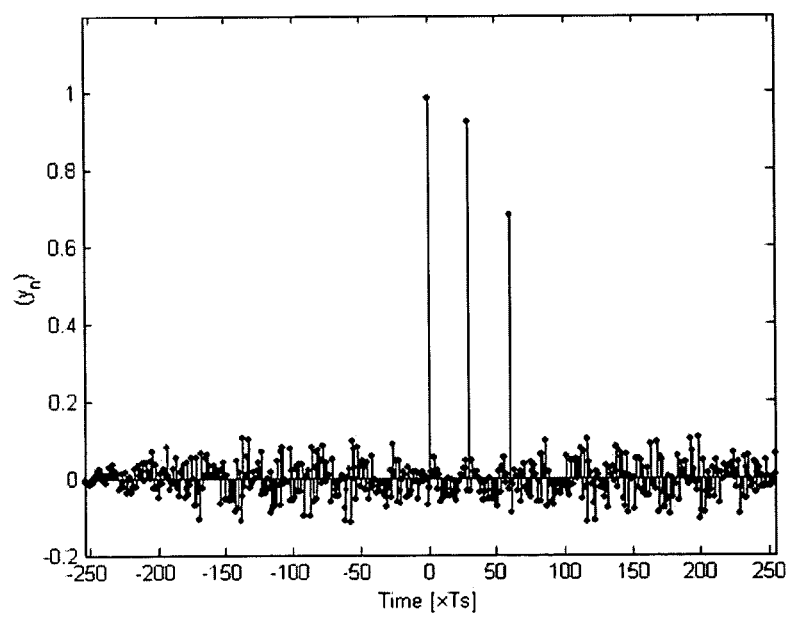
Figure 7C:
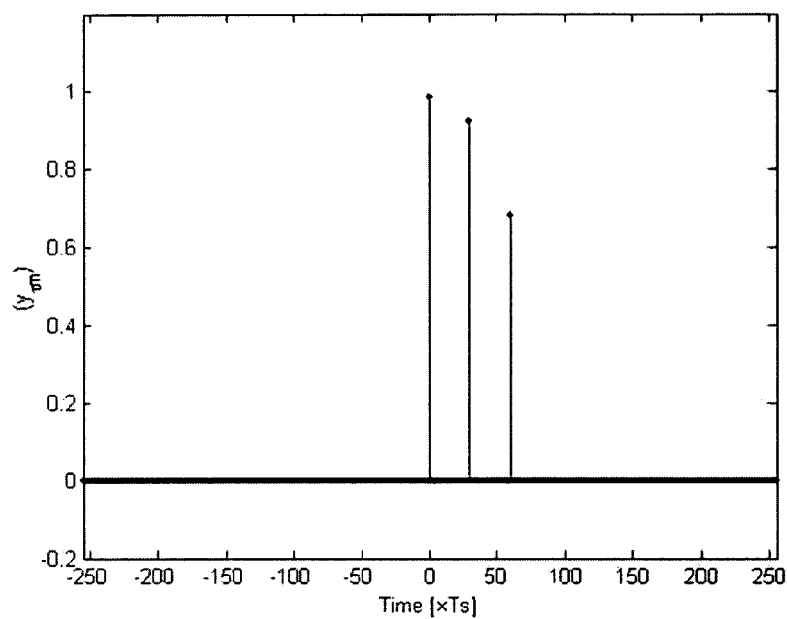
Figure 7D:
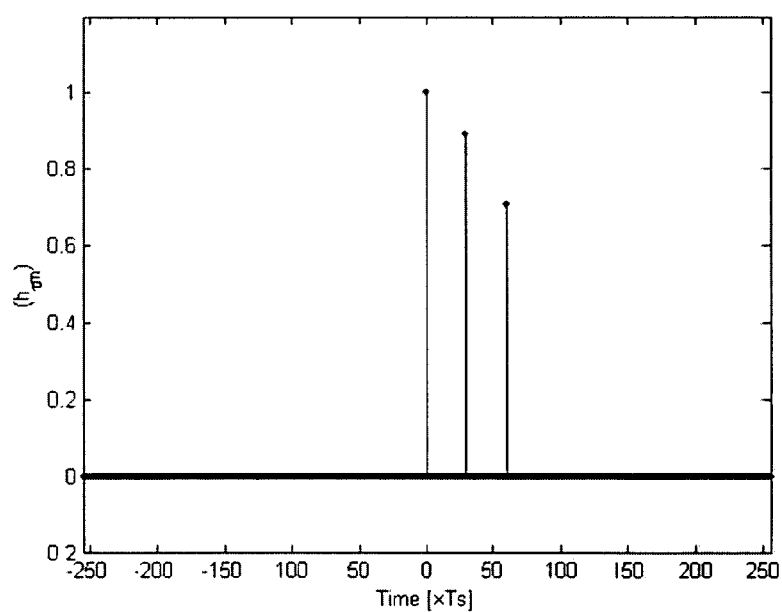
Figure 7E:
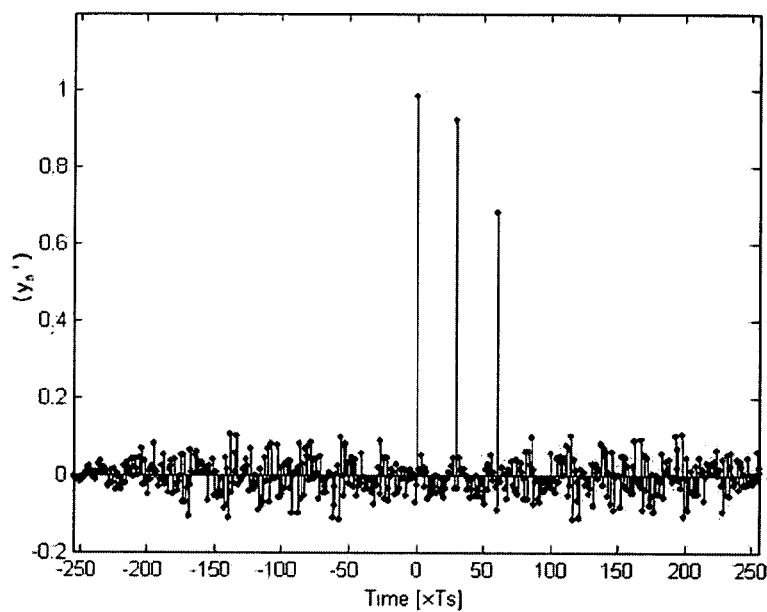
Figure 7F:
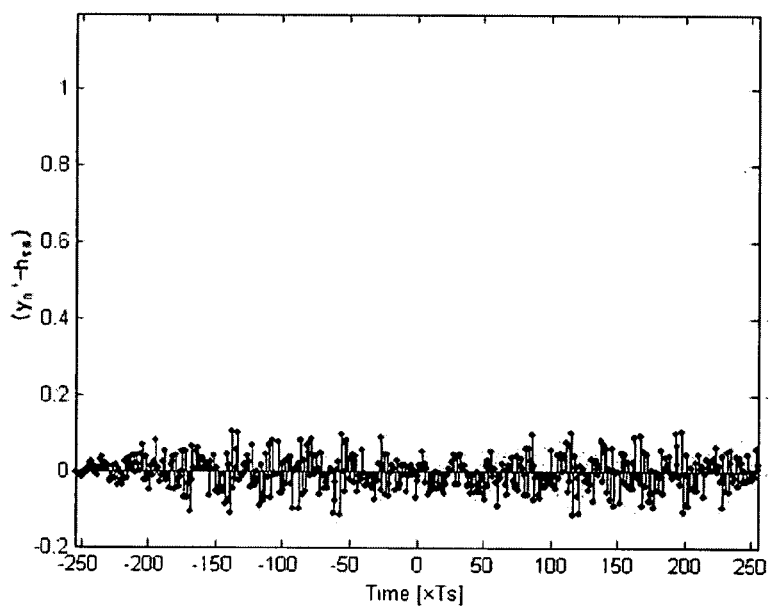
Figure 7G:
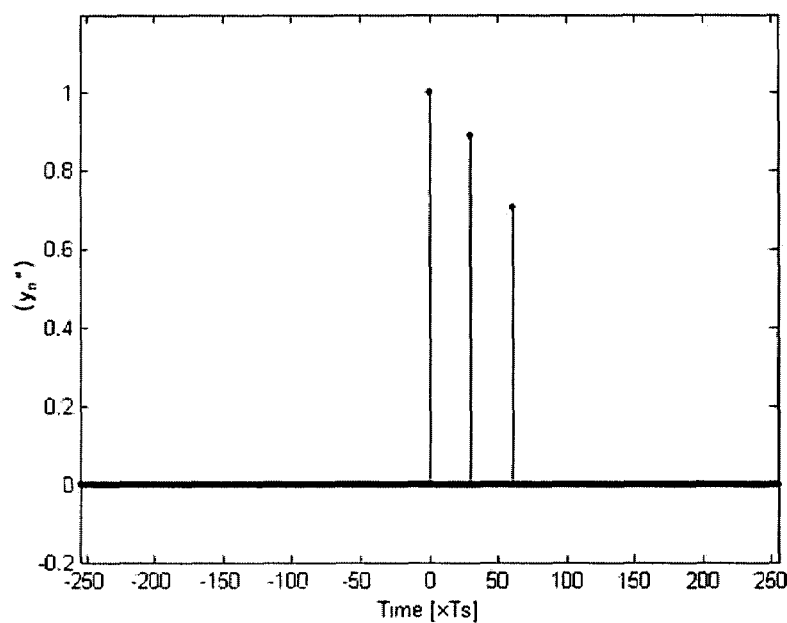
Figure 7H:
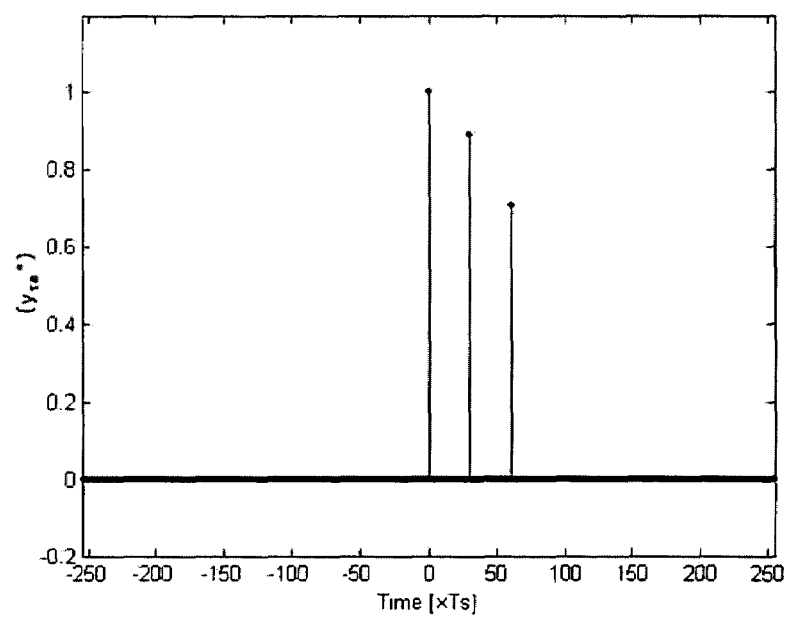

When the channel impulse response function $h_n$ shown in FIG. 7A is compared with the second multi-path $y_{\tau m}''$, which has been finally estimated, shown in FIG. 7H, the second multi-path $y_{\tau m}''$ can be estimated without error, with respect to the channel impulse response function $h_n$.

According to the present invention, the channel estimation apparatus can remove the correlation noise which causes an error in channel estimation, so that the channel estimation apparatus can estimate weak multi-path smaller than the correlation noise, when weak multi-path exists. Further, when strong multi-path exists, the channel estimation apparatus can estimate the channel more accurately. Accordingly, the present invention can improve synchronization and equalization performance using channel estimation in a digital communication system.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A channel estimation apparatus in a digital communication system comprising:
   a correlation unit for obtaining a correlation function of a first received signal by means of a correlation between a received synchronizing signal and a reference synchronizing signal, and obtaining a correlation function of the received synchronizing signal by means of a correlation between the synchronizing signals;
   a first estimating unit for estimating a first multi-path by applying a first threshold value to the correlation function of the first received signal;
   a correlation noise removing unit for obtaining a correlation function of a second received signal by removing correlation noise included in the correlation function of the first received signal, by means of the first multi-path; and
   a second estimating unit for estimating a second multi-path by applying a second threshold value to the correlation function of the second received signal in which the correlation noise has been removed.

2. The channel estimation apparatus in a digital communication system as claimed in claim 1, wherein the correlation noise removing unit obtains a channel impulse response function $h_{\tau m}$ backtracked by means of the first multi-path $y_{\tau m}$ in which $_{\tau m}$ represents a location of the estimated multi-path, obtains a correlation function $y_n'$ of a third received signal by means of the backtracked channel impulse response function $h_{\tau m}$, obtains the correlation noise $N_n$ by subtracting the backtracked channel impulse response function $h_{\tau m}$ from the correlation function $y_n'$ of the third received signal, and obtains the correlation function $y_n''$ of the second received signal by removing the correlation noise $N_n$ from the correlation function $y_n$ of the first received signal.

3. The channel estimation apparatus in a digital communication system as claimed in claim 2, wherein the backtracked channel impulse response function $h_{\tau m}$ is defined by an equation,
   $h_{\tau m} = x_{\tau m}^{-1} y_{\tau m}$, wherein $x_{\tau m}$ is the correlation function $x_n$ of the synchronizing signal corresponding to $\tau m$.

4. The channel estimation apparatus in a digital communication system as claimed in claim 2, wherein the correlation noise $N_n$ is defined by an equation, $$N_n = y_n' - h_{\tau m}.$$

5. The channel estimation apparatus in a digital communication system as claimed in claim 2, wherein the correlation function $y_n''$ of the second received signal is defined by an equation, $$y_n'' = y_n - N_n = y_n - (y_n' - h_{\tau m}).$$

6. The channel estimation apparatus in a digital communication system as claimed in claim 1, wherein the correlation noise removing unit removes the correlation noise in sequence according to a size of the first multi-path $y_{\tau m}$.

7. The channel estimation apparatus in a digital communication system as claimed in claim 1, wherein the correlation noise removing unit removes the correlation noise according to a sequence in which the first multi-path $y_{\tau m}$ is received.

8. The channel estimation apparatus in a digital communication system as claimed in claim 1, wherein the reference synchronizing signal is a PN sequence.

9. A channel estimation method in a digital communication system comprising the steps of:
   (1) obtaining a correlation function of a first received signal by means of a correlation between a received synchronizing signal and a reference synchronizing signal, and obtaining a correlation function of the received synchronizing signal by means of a correlation between the synchronizing signals;
   (2) estimating a first multi-path by applying a first threshold value to the correlation function of the first received signal, which represents a location of the estimated multi-path;
   (3) obtaining a correlation function of a second received signal by removing a correlation noise included in the correlation function of the first received signal, by means of the first multi-path, and (4) estimating a second multi-path by applying a second threshold value to the correlation function of the second received signal in which the correlation noise has been removed.

10. The channel estimation method in a digital communication system as claimed in claim 9, wherein, in step 3, channel impulse response function $h_{\tau m}$ backtracked by means of the first multi-path $y_{\tau m}$ is obtained, a correlation function $y_n'$ of a third received signal is obtained by means of the backtracked channel impulse response function $h_{\tau m}$, the correlation noise $N_n$ is obtained by subtracting the backtracked channel impulse response function $h_{\tau m}$ from the correlation function $y_n'$ of the third received signal, and the correlation function $y_n''$ of the second received signal is obtained by removing the correlation noise $N_n$ from the correlation function $y_n$ of the first received signal.

11. The channel estimation method in a digital communication system as claimed in claim 10, wherein the backtracked channel impulse response function $h_{\tau m}$ is defined by an equation, $h_{\tau m} = x_{\tau m}^{-1} y_{\tau m}$, wherein $x_{\tau m}$ is the correlation function $x_n$ of the synchronizing signal corresponding to $\tau m$.

12. The channel estimation method in a digital communication system as claimed in claim 10, wherein the correlation noise $N_n$ is defined by an equation, $$N_n = y_n' - h_{\tau m}.$$

13. The channel estimation method in a digital communication system as claimed in claim 10, wherein the correlation function $y_n''$ of the second received signal is defined by an equation, $y_n'' = y_n - N_n = y_n - (y_n' - h_{\tau m})$.

14. The channel estimation method in a digital communication system as claimed in claim 9, wherein, in step 3, the correlation noise is removed in sequence according to a size of the first multi-path $y_{\tau m}$.

15. The channel estimation method in a digital communication system as claimed in claim 9, wherein in step 3, the correlation noise is removed according to a sequence in which the first multi-path $y_{\tau m}$ is received.

16. The channel estimation method in a digital communication system as claimed in claim 9, wherein the reference synchronizing signal is a PN sequence.

* * * * *